United States Patent
Park

(10) Patent No.: US 8,401,374 B2
(45) Date of Patent: Mar. 19, 2013

(54) APPARATUS AND METHOD OF MANAGING DATA STORED IN A DATA STORAGE UNIT TO ENSURE A STORAGE SPACE

(75) Inventor: Jeong Gun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1670 days.

(21) Appl. No.: 11/508,828

(22) Filed: Aug. 24, 2006

(65) Prior Publication Data

US 2007/0047914 A1    Mar. 1, 2007

(30) Foreign Application Priority Data

Aug. 25, 2005   (KR) .................. 10-2005-0078181

(51) Int. Cl.
*H04N 5/76* (2006.01)

(52) U.S. Cl. ........................................ 386/295

(58) Field of Classification Search .............. 386/83, 386/95, 124–126, 52, 292, 293–295; 725/61, 725/139, 141, 142

See application file for complete search history.

(56) References Cited

U.S. PATENT DOCUMENTS

| | | | | |
|---|---|---|---|---|
| 6,075,919 A * | 6/2000 | Omoto et al. | ................. | 386/314 |
| 6,839,902 B2 * | 1/2005 | Hirota | ............................. | 725/37 |
| 7,088,910 B2 * | 8/2006 | Potrebic et al. | ................. | 386/83 |
| 7,181,128 B1 * | 2/2007 | Wada et al. | .................... | 386/291 |
| 7,369,750 B2 * | 5/2008 | Cheng et al. | .................. | 386/292 |
| 7,426,332 B2 * | 9/2008 | Kanehira | ..................... | 386/291 |
| 7,496,272 B2 * | 2/2009 | DaSilva | ........................ | 386/291 |
| 7,529,462 B2 * | 5/2009 | Peters et al. | .................. | 386/292 |
| 2002/0054750 A1 * | 5/2002 | Ficco et al. | ..................... | 386/46 |
| 2003/0185546 A1 * | 10/2003 | Hirota | ............................. | 386/83 |
| 2003/0206719 A1 * | 11/2003 | Bumgardner et al. | .......... | 386/83 |
| 2005/0086258 A1 * | 4/2005 | Murahashi et al. | ........ | 707/104.1 |
| 2005/0111830 A1 * | 5/2005 | Kanehira | ........................ | 386/83 |
| 2005/0117870 A1 * | 6/2005 | Lee | .................................. | 386/4 |
| 2005/0160462 A1 * | 7/2005 | Shikata et al. | ................. | 725/58 |
| 2005/0183123 A1 * | 8/2005 | Lee et al. | ........................ | 725/47 |
| 2006/0140584 A1 * | 6/2006 | Ellis et al. | ...................... | 386/83 |
| 2006/0212904 A1 * | 9/2006 | Klarfeld et al. | ................ | 725/46 |
| 2007/0127887 A1 * | 6/2007 | Yap et al. | ...................... | 386/95 |
| 2007/0168601 A1 * | 7/2007 | Plourde, Jr. | ................... | 711/112 |
| 2008/0253746 A1 * | 10/2008 | Wood | ............................ | 386/124 |
| 2009/0310937 A1 * | 12/2009 | Ellis et al. | ...................... | 386/83 |
| 2010/0239228 A1 * | 9/2010 | Sano | .............................. | 386/83 |

FOREIGN PATENT DOCUMENTS

JP       2004/89418       * 10/2004
WO       WO 2004/070725  *  8/2004

OTHER PUBLICATIONS

Yamada, Machine generated translation of JP 2004-289418, Oct. 2004.*

* cited by examiner

*Primary Examiner* — David Harvey

(74) *Attorney, Agent, or Firm* — Birch, Stewart, Kolasch & Birch, LLP

(57) ABSTRACT

An apparatus and method of managing data stored in a data storage unit is provided. Data stored in the storage unit is classified into data to be preserved and deletable data. The data is preserved or deleted on the basis of preservation setting and a preservation period of the data in the storage unit. The preserving and deleting of the data may be automatically or manually performed based on the remaining storage capacity of the storage unit.

11 Claims, 8 Drawing Sheets

APPARATUS AND METHOD OF MANAGING
DATA STORED IN A DATA STORAGE UNIT
TO ENSURE A STORAGE SPACE

BACKGROUND OF THE INVENTION

1. Field of the Invention

The present invention relates to an apparatus of managing data stored in a data storage unit, and a method thereof.

2. Description of the Related Art

A recording medium that records digital broadcasting signals has emerged. The recording medium includes a digital video cassette recorder (VCR), a hard disc drive (HDD), a recording device using an optical disc, and the like. With the rapid technology development, the recording capacity of the recording medium is increasing.

Digital TV receivers have come into wide use since digital broadcasting began in earnest. Nowadays the digital TV receivers providing various additional functions are emerging in response to users' various demands. A recording/reproducing apparatus, which is one of the noted additional functions of the digital TV, serves to record and reproduce a broadcasting program using a large-capacity recording medium, for example, an HDD. Unlike existing analog VCRs using tapes for storage, the digital recording/reproducing apparatus stores broadcasting programs, photographs, music, and the like in the form of digital data, so that image quality without loss of information may be ensured even if recording and reproducing are repetitively performed. Also, reproduction can be made whenever a user wants to watch a recorded program.

FIG. 1 is a block diagram of a general digital broadcasting recording/reproducing apparatus.

Referring to FIG. 1, the digital broadcasting recording/reproducing apparatus includes a tuner/demodulator 2 receiving a broadcasting signal from a transmission medium by wire or wirelessly and outputting digital data, a stream controller 4 controlling a transfer path of a data stream from the tuner/demodulator 2, a demultiplexer (DEMUX)/moving picture experts group (MPEG) decoder 6 connected to an output port of the stream controller 4, an MPEG memory 8 connected to the DEMUX/MPEG decoder 6, and an RAM 12, a CPU 14, a ROM 16, a user interface 18 and an HDD 20 connected to a system bus 10 in common.

Under control of the CPU 14 via the system bus 10, the tuner/demodulator 2 receives a broadcasting signal inputted through an input line 1 from a transmission medium, converts the broadcasting signal to a digital data stream, and outputs the digital data stream. Under control of the CPU 14 via the system bus 10, the stream controller 4 receives the data stream from the tuner/demodulator 2, and outputs the data stream to the HDD 20 for storage or to the DEMUX/MPEG decoder 6 for reproduction. Also, under control of the CPU 14, the stream controller 4 allows data stream stored in the HDD 20 to be outputted to the DEMUX/MPEG decoder 6 via the system bus 10 so that the data stream is reproduced. Under control of the CPU 14, the DEMUX/MPEG decoder 6 selects a data stream inputted from the stream controller 4, stores the selected data stream in an MPEG memory 8, reads and decodes the stored data stream using the MPEG method, and outputs the decoded data stream through an output line.

The CPU 14 performs a control operation in response to user command inputted from the user interface via the system bus 10. For example, the CPU 14 allows the tuner/demodulator 2 to convert a channel in response to user command, and allows the stream controller 4 to change a data stream transfer path. In addition, the CPU 16 allows the DEMUX/MPEG decoder 6 to select an input data stream in response to user command. The RAM 12 and the ROM 16 are used during the control operation of the CPU 14. As described above, the digital broadcasting recording/reproducing apparatus stores a received data stream using the HDD 20 and then reproduces the data stream, or stores the received data stream while reproducing it. For example, a broadcasting program broadcasted in real time is recorded on the HDD using functions of time shift, recording-reservation, instant reservation, or the like. A user can watch the recorded broadcasting program whenever he/she wants.

However, a storage medium of the digital broadcasting recording/reproducing apparatus has a limited capacity. For this reason, when a material is recorded, occupying certain capacity of the storage medium, it is impossible for the apparatus to keep recording the program because of lack of the storage capacity. To solve the lack of capacity, a user should manage recorded materials in person. For example, a user should select and delete a specific recorded material to provide a recording space for a new material.

SUMMARY OF THE INVENTION

Accordingly, the present invention is directed to an apparatus and method of managing data that substantially obviates one or more problems due to limitations and disadvantages of the related art.

An object of the present invention is to provide an apparatus and method of managing data, which can ensure a storage space in a data recording/reproducing apparatus.

Another object of the present invention is to provide an apparatus and method of managing data, which can ensure a storage space by managing data that has never been preserved or data whose preservation period has expired based on preservation setting information of recorded data.

A further another object of the present invention is to provide an apparatus and method of managing data, which can ensure a storage space by deleting data which has not been preserved or data whose preservation period has expired.

A still further another object of the present invention to provide an apparatus and method of managing data, which can perform efficient management of data by displaying a preservation setting screen or a menu on a list of reproduction-completed data or stored data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of managing data for a recording/reproducing apparatus, including: setting management information to determine data to be preserved and deletable data with respect to digital data stored in a storage unit; and managing data on the basis of the set management information.

In another aspect of the present invention, there is provided a data managing method of a recording/reproducing apparatus, including: displaying a user interface for setting management information of digital data stored in a storage unit; and storing setting information about data to be preserved and deletable data that are selected by a user through the user interface. The deletable data is searched on the basis of the management information according to a remaining capacity of the storage unit, and the searched deletable data is deleted.

In a further another aspect of the present invention, there is provided a data recording/reproducing apparatus including: a receiving unit receiving digital data; a storage unit storing the received digital data; a managing unit setting whether or not data is to be preserved and a preservation period with respect to the digital data of the storage unit, and managing the corresponding digital data on the basis of set information; and a user interface allowing inputting of whether or not the data is preserved and the preservation period, thereby performing data management of the storage unit on the basis of management information.

A recording space management method of the recording/reproducing apparatus according to the present invention may automatically manage unnecessary recorded materials by preservation setting on the recorded materials when a recording space is insufficient. Therefore, a required recording space can be ensured, and a recorded material that should be preserved is conveniently preserved. Accordingly, the recording space management and the recording material management can be more effectively performed.

Also, a recording material to be deleted may be automatically deleted by performing recorded material delete setting, so that the recording space management and the recording material management can be conveniently performed.

In addition, a failure in reserved recording due to the lack of a recording space may be prevented at the time of reserved recording of digital broadcasting.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
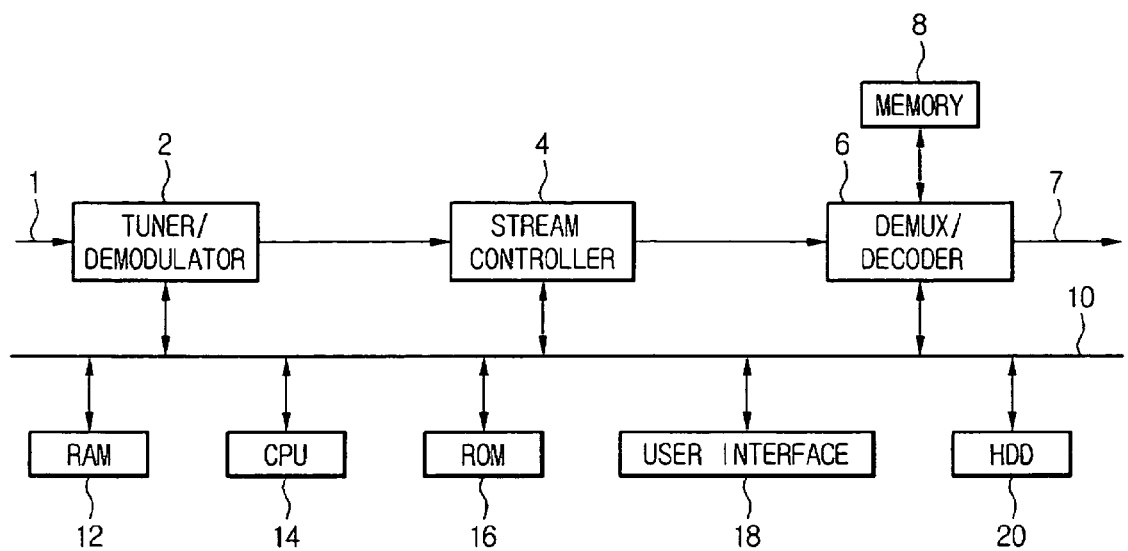
FIG. 1 is a block diagram of a general digital broadcasting recording/reproducing apparatus.
Figure 2:
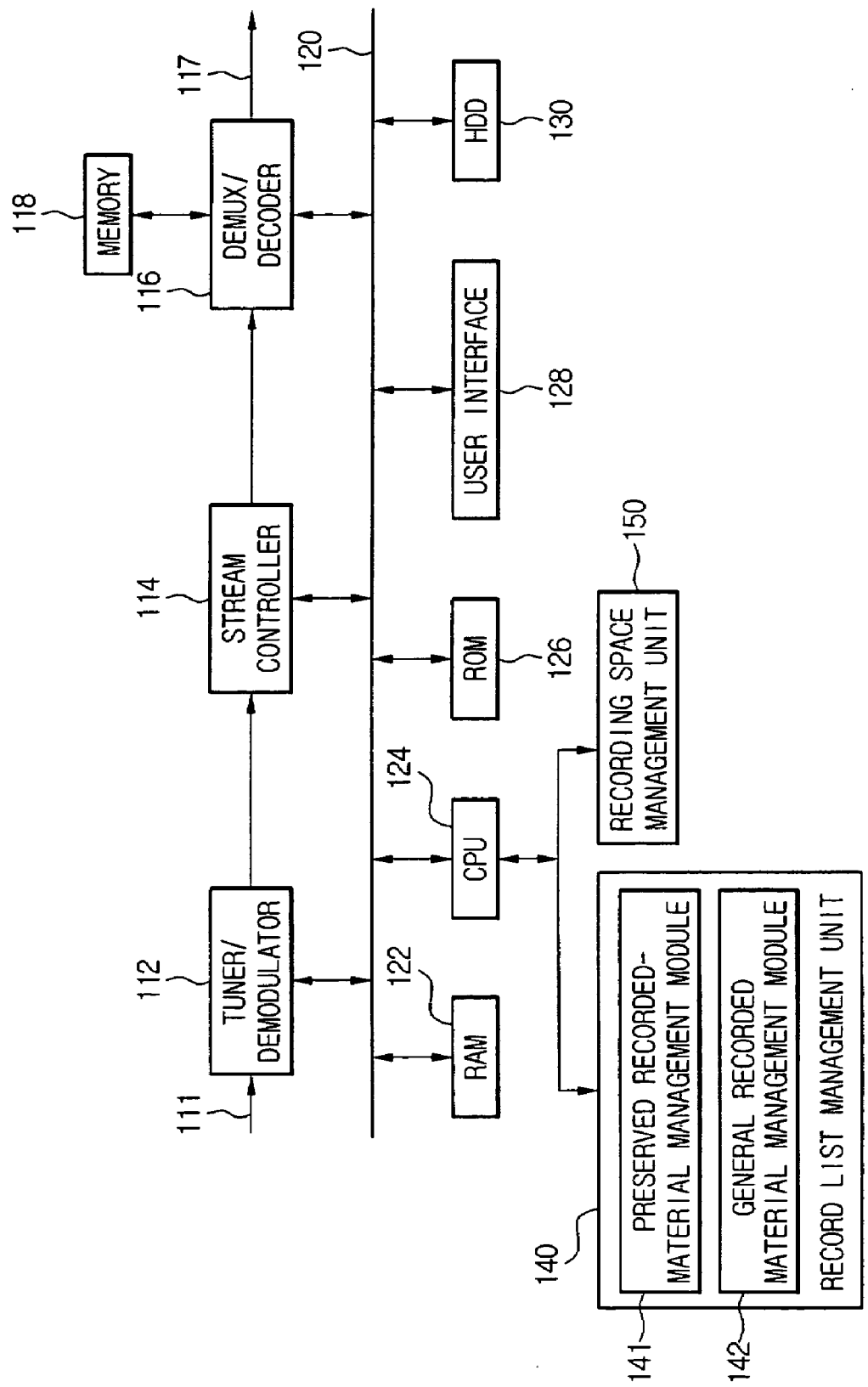
FIG. 2 is a block diagram of a storage space managing apparatus in a recording/reproducing apparatus according to an embodiment of the present invention.

FIG. 2 is a block diagram of a recording space management device in a recording/reproducing apparatus according to an embodiment of the present invention.

Referring to FIG. 2, the recording space management apparatus includes a tuner/demodulator 112 receiving a broadcasting signal and outputting digital data; a stream controller 114 controlling a transfer path of a data stream from the tuner/demodulator 112; a demultiplexer (DEMUX)/decoder 116 connected to an output port of the stream controller 114; a memory 118 connected to the DEMUX/decoder 116; a RAM 122, a CPU 124, a ROM 126, a user interface 128 and an HDD 130 which is a storage medium storing a recorded material and the like, all of which are connected to a system bus 120 in common; a record list management unit 140 managing a list of recorded materials based on whether or not the preservation of the recorded materials has been set up; and a recording space management unit 150 managing a recording space in case of lack of the recording space.

Under control of the CPU 124 via the system bus 120, the tuner/demodulator 112 converts a broadcasting signal inputted through an input line 111 from a transmission medium into a digital data stream, and outputs the digital data stream. The transmission medium includes a wired or wireless transmission line or a transmission unit that can receive digital image data and/or digital audio data. Under control of the CPU 124 via the system bus 120, the stream controller 114 receives a data stream from the tuner/demodulator 112, and outputs the data stream to the HDD 130 for storage, or outputs the data stream to the DEMUX/decoder 116 for reproduction. The decoder includes a moving picture experts group (MPEG) decoder. Under control of the CPU 124, the stream controller 114 outputs a data stream stored in the HDD 130 to the DEMUX/decoder 116 through the system bus 120 for reproduction. Under control of the CPU 124, the DEMUX/decoder 116 selects a data stream inputted from the stream controller 114, stores the data stream in the memory 118, reads and decodes the stored data stream, and outputs the decoded data stream through an output line 117.

The CPU 124 performs a control operation corresponding to user command inputted from the user interface 128 via the system bus 120. For example. The CPU 124 allows the tuner/demodulator 112 to convert a channel in response to user command, and allows the stream controller 114 to convert a data stream transfer path. The CPU 124 allows the DEMUX/decoder 116 to select an input data stream in response to user command. The RAM 122 and the ROM 126 are used in the control operation Such a recording/reproducing apparatus is a real-time digital broadcasting recording/reproducing apparatus, and stores a received data stream (broadcasting program) as a recorded material on the HDD 130, and then reproduces the received data stream, or reproduces the received data stream while storing it. For example, the broadcasting program broadcasted in real time is recorded on the HDD 130 through time shift, reversed recording, immediate recording, and the like, and may be reproduced whenever a user wants. The digital data includes a broadcasting program, image data, au audio data file, etc.

The recording/reproducing apparatus according to an embodiment of the present invention includes the record list management unit 140 managing recorded materials (or stored materials) on the HDD 130, and the recording space management unit 150. The recording space management unit 150 automatically or manually performs recording space management when the capacity occupied by materials recorded on the HDD 130 is the same as or greater than a predetermined reference value, that is, when a remaining recording space of the entire capacity of the HDD 130 is smaller than the reference value. The recording space management unit 150 provides a window, for example, a pop-up window, to ensure a recording space on a screen in case of the lack of recording space, and also secures a recording space in response to user command.

To ensure the recording space, recorded materials are classified based on whether or not they are to be preserved, and a preservation status of the classified recorded materials is managed. To this end, the record list management unit 140 includes a preserved recorded-material management module 141, and a general recorded-material management module 142, and manages the recorded materials to ensure the recording space depending on whether or not the recorded materials are preserved. The preserved recorded-material management module 141 manages recorded materials that are set by a user to be preserved for a predetermined preservation period. Also, the preserved recorded-material management module 141 manages the entire capacity of the preserved recorded materials, and checks preservation periods of the recorded materials. The preservation period is set up to a certain date and/or time. The preservation period may be limited, or may be infinite.

When a preservation period of a preserved recorded material expires, the preserved recorded-material management module 141 sends the corresponding recorded material to the general recorded material management module 142, and thus the sent recorded material is managed by the general recorded material management module 142. Also, the preserved recorded-material management module 141 may allow a user to confirm whether to reset the preservation setting at the moment when the preservation period expires or before the expiration date or time, for example, one day before the expiration date.

The general recorded material management module 142 manages a list of simple recorded materials, which have not been preserved from the first place, or recorded materials whose preservation periods have expired. The list of recorded materials managed by the general recorded material management module 142 may be deleted when the user inputs a recording space ensure command. Here, when the recording space ensure command is inputted, recorded materials corresponding to the entire list stored on the HDD 130 may be deleted, the simple recorded materials that have never been preserved may be deleted first, or the recorded material whose preservation period has expired may be deleted first. The order of deleting may be set by the user as an option.

The user performs preservation setting on recorded materials. The user can perform preservation setting with respect to each of the recorded materials if necessary. Also, if the recorded material is being reproduced, the preservation setting is performed at an arbitrary point of time, for example, when the reproduction is started, while the reproduction is being made, or when the reproduction is terminated. In such a manner, the preservation setting may be released with respect to existing recorded material that have been previously preserved.

Figure 3:
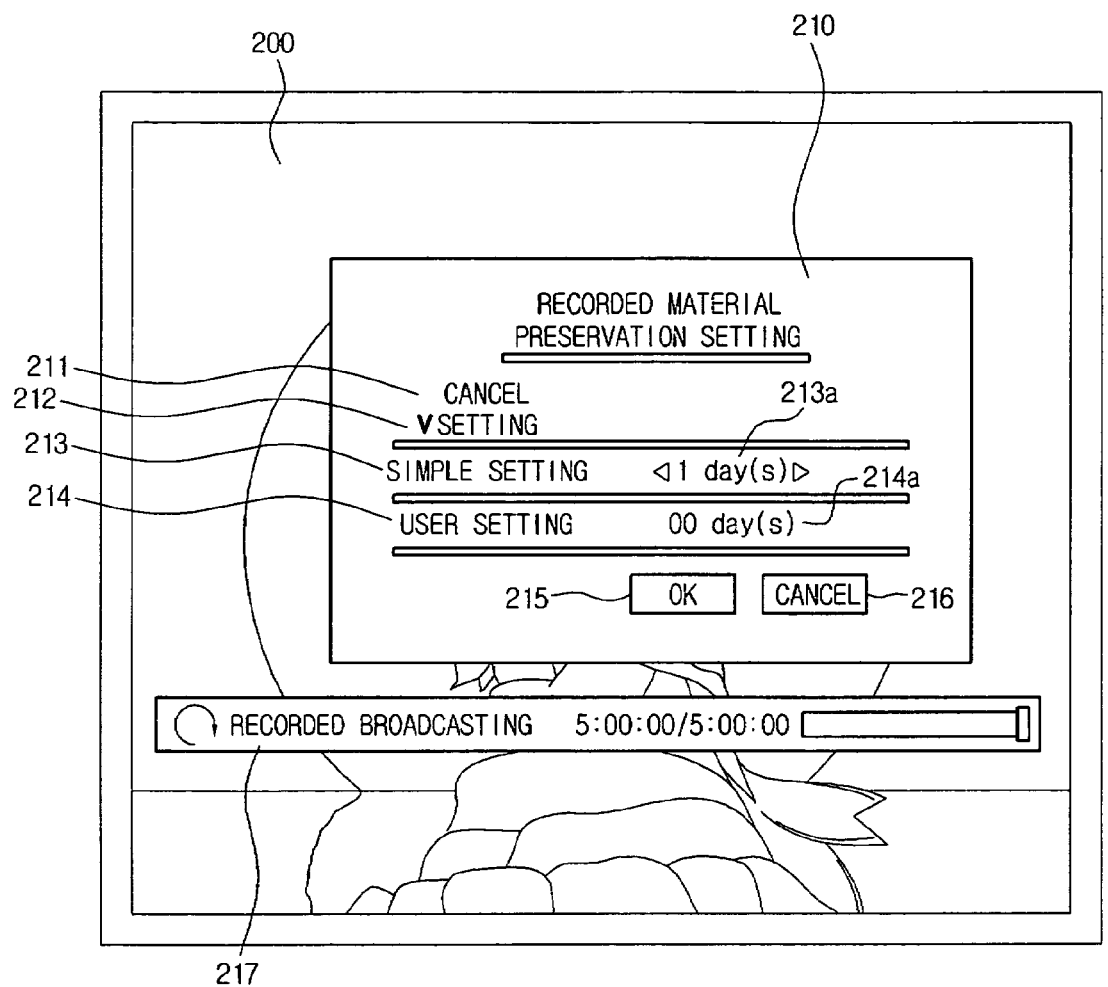
FIG. 3 is a view illustrating a preservation setting screen in the recording/reproducing apparatus according to an embodiment the present invention.

FIG. 3 is a view showing a recorded-material preservation setting screen, that is, a graphic user interface, when the reproduction of the recorded material is terminated according to an embodiment of the present invention.

Referring to FIG. 3, a recorded-material preservation setting screen 210 is displayed on a reproduction screen 200 of a recorded material. A display type of the recorded material preservation setting screen 210 may adopt an on screen display (OSD) type, or a graphic user interface (GUI) type. In FIG. 3, the recorded-material preservation setting screen is displayed, that is, the recorded-material preservation setting is performed when the reproduction of the recorded material is terminated. However the point of time for the recorded-material preservation setting is not limited to the description. In FIG. 3, the termination of the recorded-material reproduction can be recognized from a reproduction status bar 217 displayed on a lower end of the reproduced screen 200.

The recorded-material preservation setting screen 210 includes a cancel item 211, a setting item 212, a simple setting item 213, a user setting item 214, a confirm item 215 and a cancel item 216. The cancel item 211 is used to release recorded-material preservation setting. The setting item 212 is used to set recorded-material preservation. The simple setting item 213 is used to set a preservation period on daily, weekly, or monthly basis from a current date. The user setting item 214 is used to allow a user to directly set the preservation period. The confirm item is used to store set information, and the cancel item 216 is used to cancel a preservation setting operation.

To perform preservation setting for a recorded material, the setting item 212 is selected on the recorded-material preservation setting screen illustrated in FIG. 3. Then, a desired preservation period is set using the simple setting item 213 or the user setting item 214. When being set using the simple setting item 213, the preservation period may be set to one day, one week, one month, six months, a year, or more using an up/down key 213*a*. When being set using the user setting item 214, the preservation period desired by the user may be directly inputted through number keys provided to a remote controller (not shown) included in the user interface 128. The preservation period is counted from a time point at which the recorded material preservation setting is made.

When the confirm item 215 is selected after the preservation of the corresponding recorded material is set through the simple setting or user setting in the aforementioned manner, the preservation setting for the recorded-material is completed. Setting information is managed by the record list management unit 140. The setting information includes a recorded material, information on whether or not the recorded material is preserved, and the preservation period of the preserved recorded material, and is stored in the record list management unit 140.

When a user tries to delete a preservation-set recorded material (i.e., preserved recorded material), the user may be notified that the corresponding recorded material has been preserved by generating data related to the preservation status of the recorded material in a pop-up message type or an OSD type, and displaying the data on a screen. Thus, the preserved recorded object can be safely preserved during the preservation period.

Figure 4:
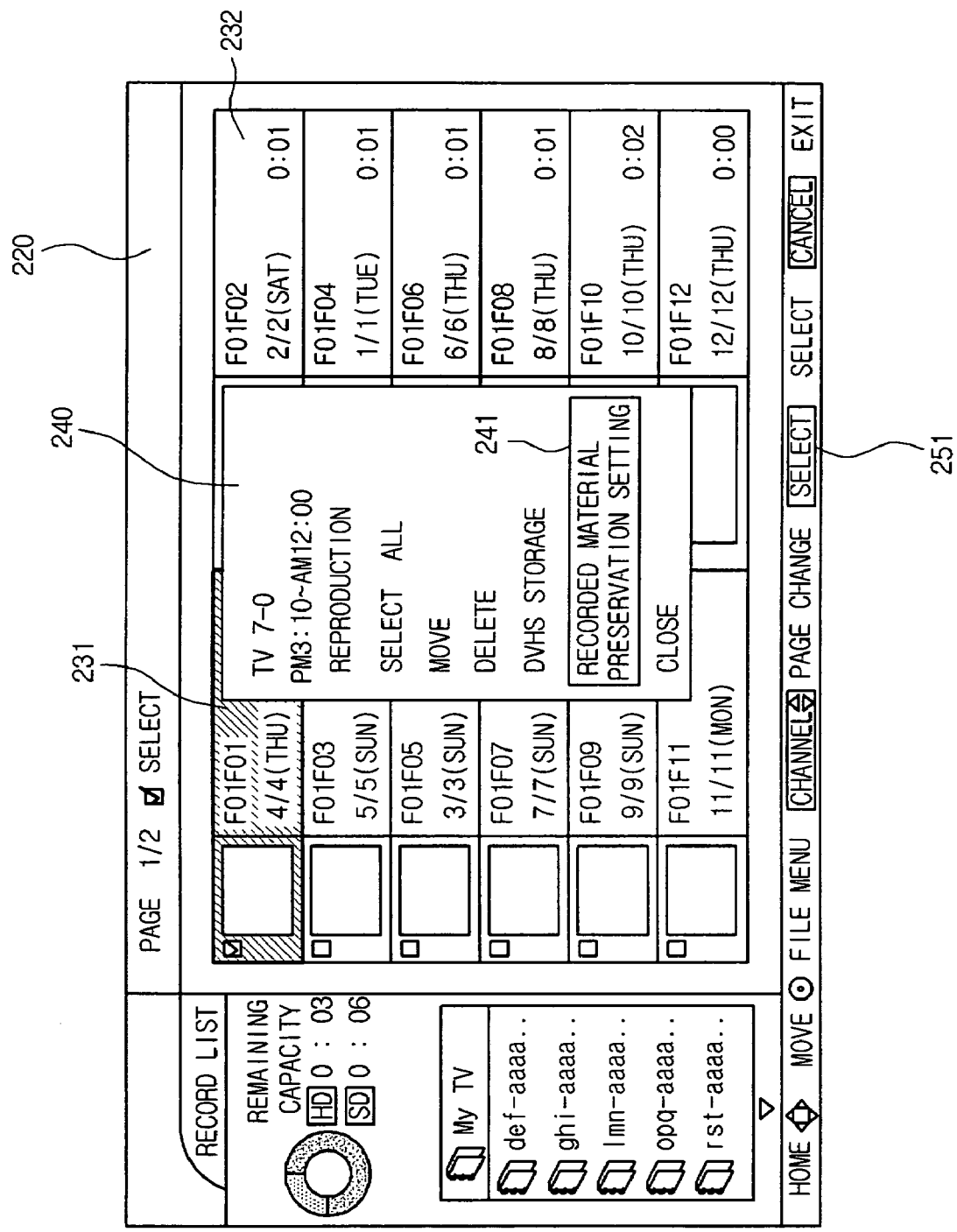
FIG. 4 is a view illustrating an preservation setting screen on a data list in the recording/reproducing apparatus according to an embodiment of the present invention.

FIG. 4 is a view illustrating a screen showing a preservation status of a recorded material on a list of the recorded materials according to an embodiment of the present invention. The preservation status of the recorded materials is displayed in the form of OSD or GUI. Recorded materials 231 and 232 are displayed on a recorded-material list screen 220, and a management menu 240 of a selected recorded material is displayed to display management information. Also, the remaining capacity of a storage unit is displayed according to a storage quality (HD or SD), and folder information including recorded materials is displayed. Items for control operations, such as move, select, exit, or the like, are displayed on the list or the menu.

Referring to FIG. 4, when a plurality of recorded materials 231, 232, . . . are displayed on the recorded material list screen 220 and a user selects a desired recorded material 231, a management menu 240 of the selected recording material 231 is displayed. When a recorded-material preservation setting item 241 of the management menu 240 is selected using a select item 251, the recorded-material preservation setting screen 210 illustrated in FIG. 3 is displayed, thereby allowing the recorded-material preservation setting. The recorded-material preservation setting may be individually performed on each recorded material, or more than one recorded-materials are selected and then the recorded material preservation setting may be collectively performed thereon. A recorded-material preservation releasing item is displayed on the management menu with respect to the preserved recorded material. In this manner, the user may perform preservation setting or releasing of the preservation on the recorded material list or at the moment when the reproduction of the recorded material is terminated.

When a recording space is insufficient or a recorded-material delete request is made by user command, the recording space management unit 150 secures a recording space and performs management on recorded materials by automatically deleting recording materials that have not been preserved or recording materials whose preservation periods have expired. A method of managing a recording space will be described later with reference to FIGS. 7 and 8.

Figure 5:
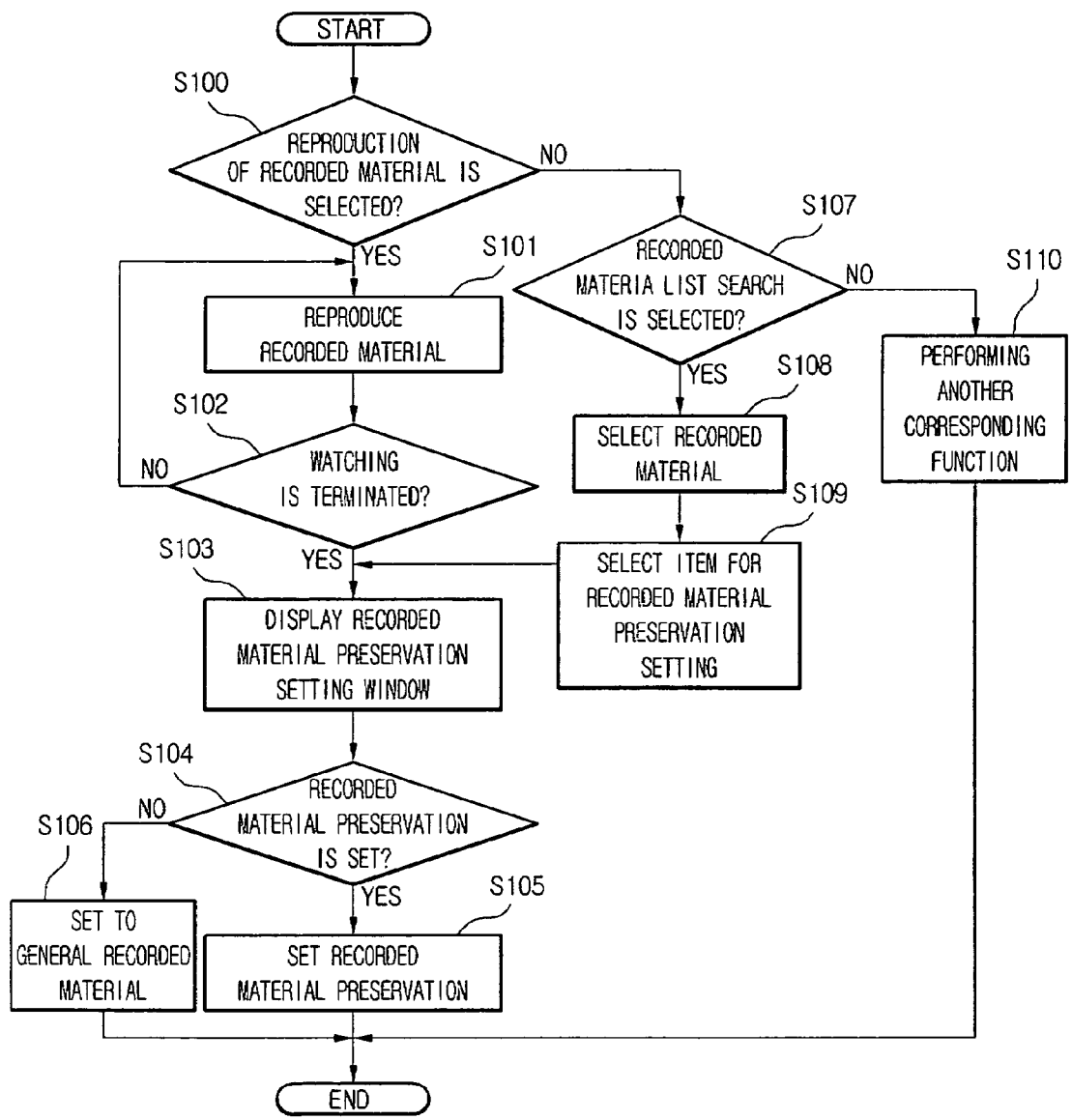
FIG. 5 is a flowchart illustrating a preservation setting method in a method of managing a storage space according to an embodiment of the present invention.

FIG. 5 is a flow chart of a method of setting preservation of recorded material in a recording-space management method for a recording/reproducing apparatus according to an embodiment of the present invention.

It is determined whether reproduction of a recorded material is selected (S100). When the reproduction of the recorded material is selected, the selected recorded material is reproduced (S101). Then, it is determined whether or not watching the recorded material being reproduced is terminated (S102). When the watching of the recorded material is not terminated, the reproduction of the selected recorded material is continued. When it is determined that the watching of the recorded material is terminated (S102), a window for recorded-material preservation setting is displayed (S103). As the window for recorded-material preservation setting, for example, the preservation-setting screen as described above with reference to FIG. 3 may be used. It is determined whether or not the recorded-material preservation setting is selected (S104). When the user inputs a preservation period and selects recorded-material preservation setting on the recorded-material preservation setting screen, the corresponding recorded material is preserved, thereby terminating the preservation setting thereof (S105). The corresponding recorded material is preserved and managed for a preservation period set by the user. Recorded materials which have not been preserved or whose preservation periods have expired are set and managed as general recorded materials (S106).

When the reproduction of the recorded material is not selected (S100), it is determined whether to search a list of recorded materials (S107). When it is determined to search the list (S107), a recorded-material list screen as illustrated in FIG. 4 is displayed. For the recorded-material preservation setting, the user selects a specific recorded material 231 on the recorded-material list screen, and selects a recorded-material preservation setting item 241 (S108, S109). Then, a recorded-material preservation setting window is displayed (S103). As the recorded-material preservation setting window, for example, the preservation setting screen as illustrated in FIG. 3 may be used. It is determined whether or not the recorded material preservation setting is selected (S104). When the user inputs a preservation period and selects recorded material preservation setting on the recorded material preservation setting screen, the corresponding material is preserved, thereby terminating the preservation setting thereof (S105). The corresponding recorded material is preserved and managed for a preservation period set by the user. Recorded materials which have not been preserved or whose preservation periods have expired are set and managed as general recorded materials (S106). When a desired operation is neither the reproduction of the recorded material nor the search for the recorded materials, another corresponding function is performed (S110).

Figure 6:
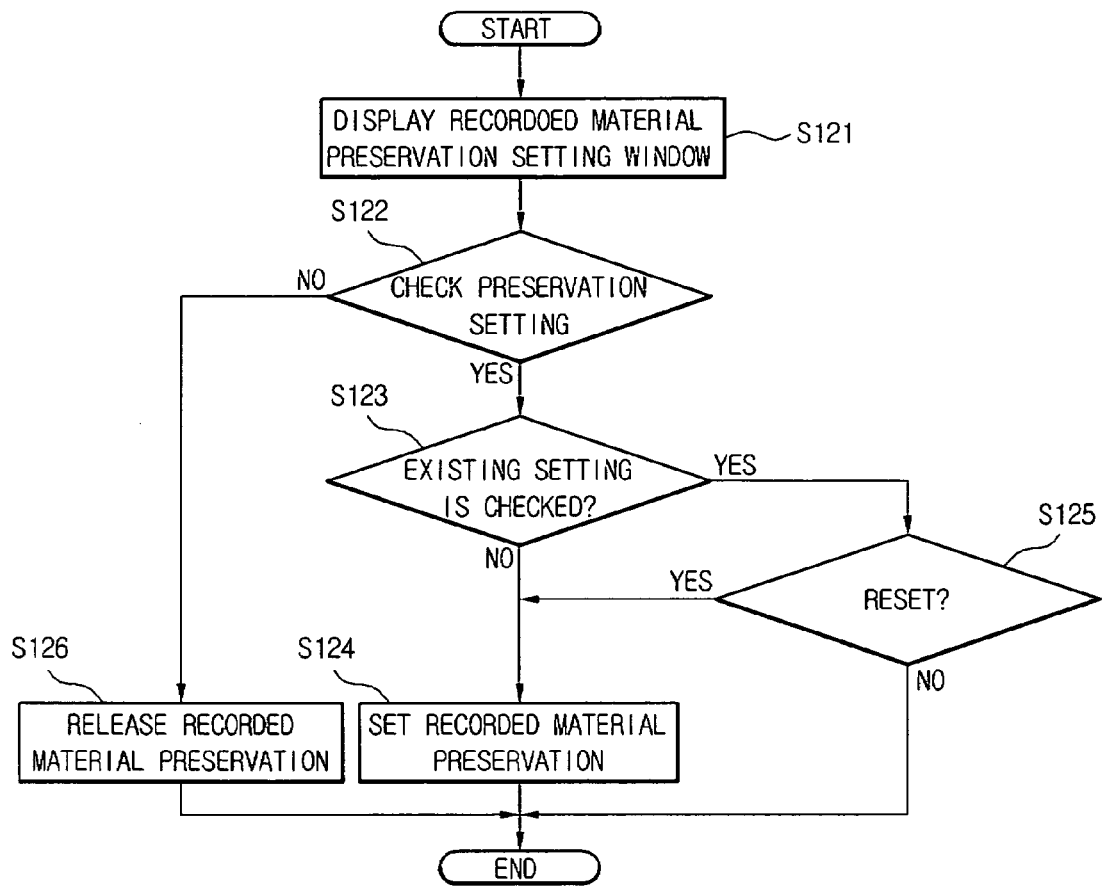
FIG. 6 is a flowchart illustrating a preservation setting method in a method of managing a storage space according to another embodiment of the present invention.

FIG. 6 is a flow chart of a method of setting preservation of recorded materials in a recording space managing method for a recording/reproducing apparatus according to another embodiment of the present invention.

A recorded-material preservation setting window, that is, the recorded material preservation setting screen as illustrated in FIG. 3 is displayed (S121). It is determined whether or not a preservation setting item 212 is selected or a cancel item 211 for releasing the preservation setting is selected on the recorded-material preservation setting screen (S122). When the cancel item 211 is selected, the preservation setting of a recorded material is canceled (S126). When the setting item 212 is selected, it is determined whether or not preservation setting has been selected before (S123). When the setting has already been made, it is determined whether to reset the preservation setting (S125). When it is determined not to reset the preservation setting, the recorded-material preservation setting is terminated. When it is determined to reset the preservation setting (S125) or new preservation setting is selected (S123), preservation setting of the recorded material is performed (S124). The record list management unit 140 stores management information on preserved recorded materials or general recorded material.

Figure 7:
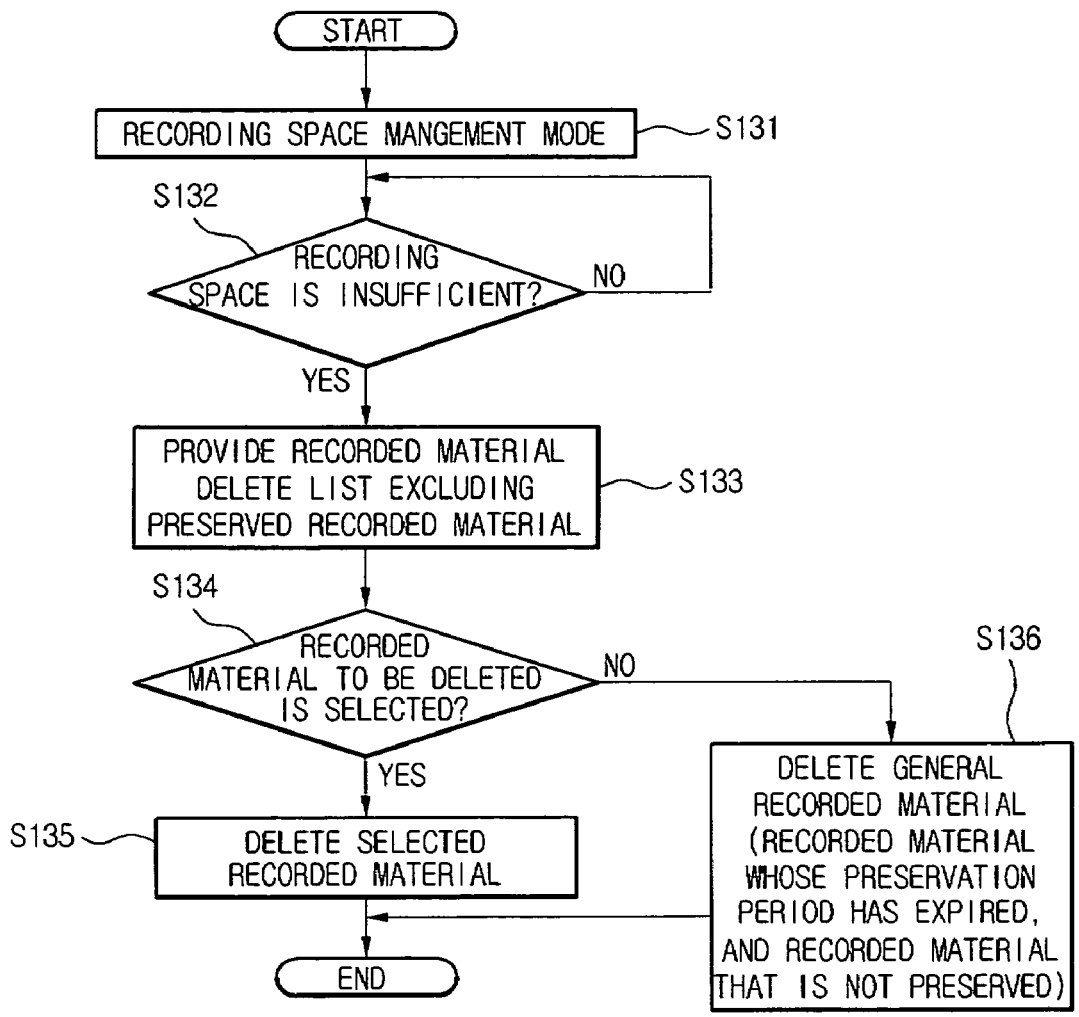
FIG. 7 is a flowchart illustrating a method of managing a storage space according to an embodiment of the present invention.

FIG. 7 is a flow chart of a recording space management method for a recording/reproducing apparatus according to an embodiment of the present invention.

A recording space management mode is selected (S131) The recording space management mode is selected by a user interface 128. When the recording space management mode is selected, a recording space management unit 150 performs management on a storage capacity of a storage medium, specifically an HDD 130, under control of a CPU 124. When the recording space management mode is started, it is checked whether or not the recording space is insufficient (S132). When the recording space is insufficient, in the recording space management mode, a list of recorded materials is displayed and provided to a user (S133). The list of the recorded materials includes deletable recorded materials. The deletable recorded materials are general recorded materials or recorded materials whose preservation periods have expired. That is, when the recording space is insufficient, preserved recorded materials, recorded materials whose preservation periods have expired, and general recorded materials are confirmed with reference to the list of recorded materials and setting information on each recorded material of the record list management unit 140. Also, of the conformed materials, the recorded materials excluding the preserved recorded materials are provided to a deleting target list.

It is determined whether or not the user selects a recorded material to be deleted from the list of the recorded materials (S134). When the recorded material to be deleted is selected, the selected recorded material is deleted (S135). When the recorded material to be deleted is not selected, all of the general recorded materials that are not preserved are deleted (S136). The general recorded materials include recorded materials whose preservation periods have expired, or recorded materials that are not preserved. When the recorded materials are deleted, deleting can be made from the oldest recorded material among the recorded materials that are not preserved. That is, to delete the recorded materials, the user may select a recorded material to be deleted, recorded materials corresponding to specific conditions may be deleted collectively, or recorded material are prioritized and are deleted in order of priority.

That is, the user is informed of the list of recorded materials whose preservation periods have expired or that are not preserved through the recording space management mode. Thus, the user may conveniently select a recorded material to be deleted and then deletes the corresponding recorded material, or all of the general recorded materials may be automatically deleted.

Figure 8:
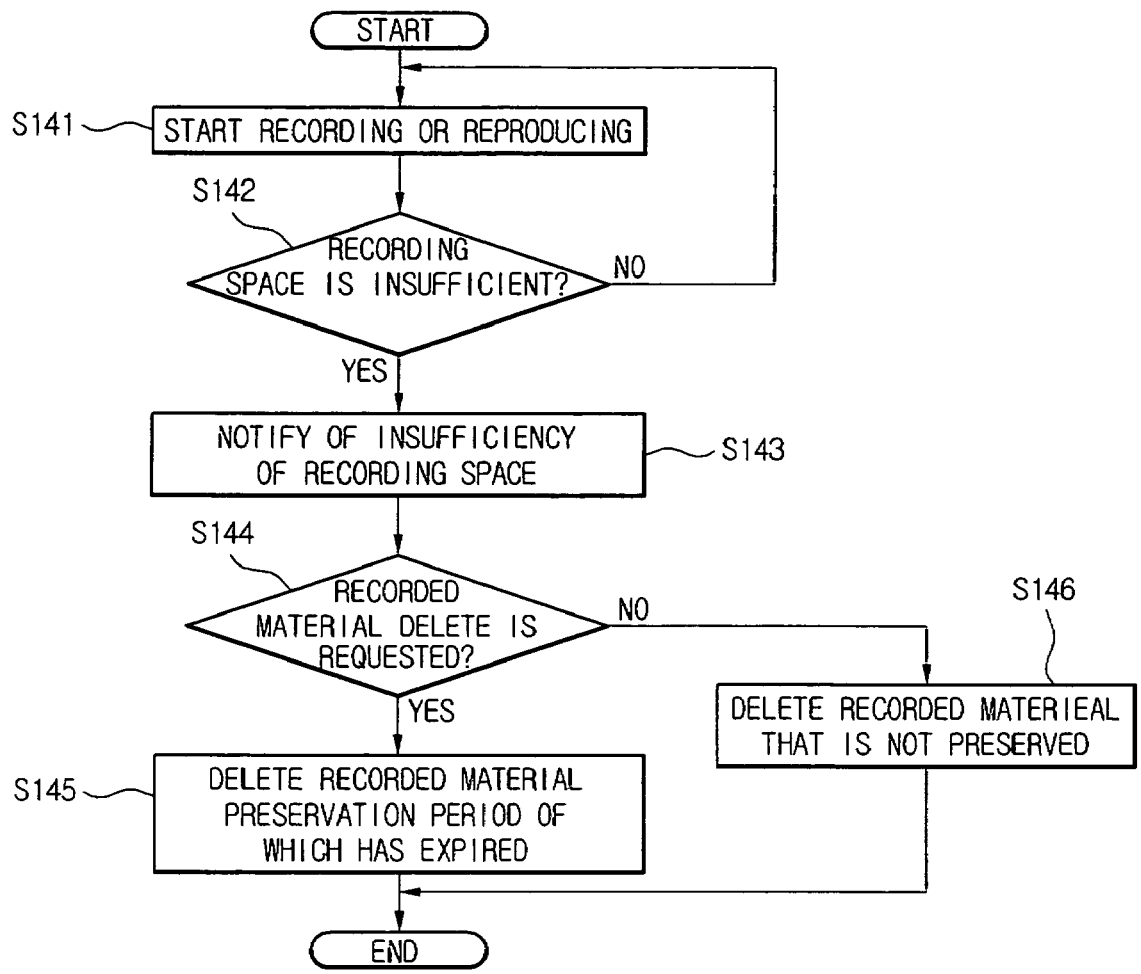
FIG. 8 is a flowchart illustrating a method of managing a storage space according to another embodiment of the present invention.

FIG. 8 is a flow chart of a recording space management method for a recording/reproducing apparatus according to another embodiment of the present invention.

In the recording space management method shown in FIG. 8, it is determined whether the recording space is insufficient at the moment when recording is started or reproducing is started. When the recording space is insufficient, the recording material is deleted. The recording space may be managed even after the termination of the recording or reproducing. Also, in the case of reserved recording, the recording space may be managed before the reserved recording is started.

Recording or reproducing is started (S141). When the recording or reproducing is started, a recording space management unit 150 checks the remaining storage capacity of a storage medium and determines whether or not a recording space is insufficient (S142). When the recording space is insufficient, a user is informed of the insufficiency of the recording space (S143). The lack of the recording space is indicated in the form of a popup window containing a corresponding message or in the form of OSD. It is checked whether or not the user informed of the lack of the recording space requests deletion of recorded materials (S144). When the recorded-material delete request from the user is present, deleting is performed from a recorded material whose preservation period has expired (S145). When no request for deleting recorded materials is made, a recorded material that has not been preserved is deleted (S146).

The deleting of the recorded materials may be performed from the oldest recorded material or the recorded material reproduced longest ago of the recorded materials that are not preserved. Alternatively, recorded materials that are not preserved may be searched and deleted first among the recorded materials to be deleted. If there are no recorded materials that are not preserved, the oldest recorded material may be deleted.

When deleting target recorded materials including recorded materials whose preservation periods have expired and recorded materials that are not preserved are sequentially deleted, the user may be informed of management information of the corresponding recorded material. For example, the user may be notified that a preservation period of a recorded material to be deleted has expired or a recorded material to be deleted is not preserved. The recorded materials are deleted automatically or manually.

A time point at which the recorded materials are deleted may be arbitrarily set by a user. For example, the user may directly set a deletion reservation date before or after recording reservation, before, during or after reproducing of a material, or at the time of searching a list of the recorded materials. The setting for deleting recorded materials is managed by a recorded-material delete list management unit 140. The recorded-material delete list management unit 140 manages recorded materials to be deleted, and provides a list of the deleting target recorded materials that is closest to the deletion reservation date when the recording space is insufficient. Because recorded materials of dates prior to a current date have already been deleted from the deleting target recorded material list, recorded materials belonging to a data next closest to the current date may be deleted from the list.

The present invention may be applied to computers, a mobile terminals (e.g., PDAs, camera phones, multimedia phons, or the like), and MP3 players.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of managing data for a recording/reproducing apparatus having a storage unit, the method comprising:
setting a preservation period of recorded-materials;
preserving the recorded-materials for the set preservation period;
checking a residual period of the preserved recorded-materials;
confirming a reset of a recorded-materials preservation setting after the preservation period expires or before an expiration date or time;
upon confirming the reset of the recorded-materials preservation setting, resetting the preservation period and preserving the recorded-materials for the reset preservation period;
if the recorded-materials preservation setting is not reset, classifying the preserved recorded-materials as general recorded-materials;
checking whether or not a remaining recording space of the storage unit is less than a reference value when data recording is started or when data reproducing is started;
displaying a list of deletable recorded-materials when the remaining recording space is less than the reference value, the deletable recorded-materials including recorded-materials whose preservation periods have expired or recorded-materials that are not to be preserved; and
deleting recorded materials in the list of deletable recorded-materials,
wherein the preserving the recorded-materials includes one of the following based on a user selection:
individually preserving the recorded-materials on each recorded-materials stored in the recording/reproducing apparatus, and
collectively preserving the recorded-materials on at least two recorded-materials that have been selected from the recorded-material stored in the recording/reproducing apparatus.

2. The method according to claim 1, wherein the preserving the recorded-materials is performed at one of a time point before or after the recorded-materials is stored, a time point from which the stored recorded-materials is reproduced, and a time point at which reproducing of the stored recorded-materials is terminated.

3. The method according to claim 1, wherein the deleting is performed automatically according to a remaining storage capacity of the storage unit.

4. The method according to claim 1, further comprising:

displaying, by the recording/reproducing apparatus, a list of the recorded-materials to be preserved and the list of deletable recorded-materials on the basis of the recorded-materials preservation setting.

5. The method according to claim 1, wherein the preserving the recorded-materials is performed before a step of reserved recording.

6. The method according to claim 1, wherein the recorded-materials preservation setting has a priority order for deletion.

7. A data recording/reproducing apparatus, comprising:

a receiving unit configured to receive digital data;

a storage unit configured to store the received digital data as a recorded-material;

a display unit configured to display the received digital data;

a management unit configured to set a preservation period of the recorded-material, preserve the recorded-material for the set preservation period, check a residual period of the preserved recorded-material, confirm a reset of a recorded-material preservation setting after the preservation period expires or before an expiration date or time, upon confirming the reset of the recorded-material preservation setting, reset the preservation period and preserve the recorded-material for the reset preservation period, and if the recorded-material preservation setting is not reset, classify the preserved recorded-material as a general recorded-material; and a user interface configured to allow inputting of whether or not the recorded-material is to be preserved and the preservation period, wherein the management unit is further configured to:

check whether or not a remaining recording space of the storage unit is less than a reference value when data recording is started or when data reproducing is started, display a list of deletable recorded-material when the remaining recording space is less than the reference value, the deletable recorded-material including recorded-material whose preservation periods have expired or recorded-material that are not to be preserved, and delete recorded-material in the list of deletable recorded-material, wherein, based on a user selection, the recorded-material is preserved individually, or more than one recorded-material is selected and then the more than one recorded-material is preserved collectively.

8. The apparatus according to claim 7, wherein the management unit is configured to automatically delete the recorded-material in the list of deletable recorded-material, and recorded-material whose preservation period has expired according to a remaining storage capacity of the storage unit.

9. The apparatus according to claim 7, wherein the management unit is configured to delete recorded-material that is not to be preserved, and recorded-material whose preservation period has expired upon receiving a delete request.

10. The apparatus according to claim 7, wherein the user interface is one of a graphic user interface (GUI) and an OSD (on screen display) including an item for selecting whether to preserve the recorded-material and for setting the preservation period.

11. The apparatus according to claim 7, wherein the recorded-material is digital TV broadcasting contents.

* * * * *